United States Patent
Nara (10) Patent No.: US 11,525,664 B2
(45) Date of Patent: Dec. 13, 2022

(54) CALIBRATION METHOD

(71) Applicant: MITUTOYO CORPORATION, Kanagawa (JP)

(72) Inventor: Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 15 days.

(21) Appl. No.: 17/380,551

(22) Filed: Jul. 20, 2021

(65) Prior Publication Data

US 2022/0042782 A1 Feb. 10, 2022

(30) Foreign Application Priority Data

Aug. 7, 2020 (JP) .............................. JP2020-134961

(51) Int. Cl.
*G01B 11/02* (2006.01)
*G01B 9/02055* (2022.01)
(Continued)

(52) U.S. Cl.
CPC ..... *G01B 9/02072* (2013.04); *G01B 9/02001* (2013.01); *G01B 11/002* (2013.01); *G01B 11/14* (2013.01)

(58) Field of Classification Search
CPC ............ G01B 9/02072; G01B 9/02001; G01B 9/02029; G01B 9/0207; G01B 11/005; G01B 11/14; G01B 21/042
See application file for complete search history.

(56) References Cited

U.S. PATENT DOCUMENTS 4,819,195 A * 4/1989 Bell .................. G01B 7/008
    318/632
2011/0085177 A1* 4/2011 Fukumoto ............ G01B 21/042
    356/601

(Continued)

FOREIGN PATENT DOCUMENTS

JP        4584029        11/2010

OTHER PUBLICATIONS

Satoru Maruyama*and Kazuhisa Fusayasu, CMM Calibration Tool Using Reference Laser Interferometer , 11th Laser Metrology for Precision Measurement and Inspection in Industry 2014, Sep. 2-5, 2014, Tsukuba, Japan (Year: 2014).*

(Continued)

*Primary Examiner* — Tarifur R Chowdhury
*Assistant Examiner* — Jonathon Cook
(74) *Attorney, Agent, or Firm* — Greenblum & Bernstein, P.L.C.

(57) ABSTRACT

A calibration method includes the steps of placing a structure to be measured at a first position, measuring a first distance from a laser interferometer to a reflector, and measuring first coordinates of a body to be measured, moving the structure to be measured to a second position, measuring a second distance from the laser interferometer to the reflector and measuring second coordinates of the structure to be measured with the coordinate measuring apparats, while the structure to be measured is at the second position, determining a scale error of the reference instrument, mounting the reference instrument, measuring the interval between objects to be measured, and calculating a calibration value of the interval between the objects to be measured.

10 Claims, 5 Drawing Sheets

(51) Int. Cl.
*G01B 11/00* (2006.01)
*G01B 11/14* (2006.01)
*G01B 9/02001* (2022.01)

(56) References Cited

U.S. PATENT DOCUMENTS

| | | | | |
|---|---|---|---|---|
| 2015/0354942 | A1* | 12/2015 | Bridges | G01B 11/14 33/503 |
| 2018/0372481 | A1* | 12/2018 | Stigwall | G01B 11/005 |
| 2019/0187660 | A1* | 6/2019 | Yanaka | G01B 9/0207 |
| 2019/0195626 | A1* | 6/2019 | Iseli | G06T 1/0014 |
| 2021/0333093 | A1* | 10/2021 | Tobiason | G01B 11/005 |

OTHER PUBLICATIONS

Panadda Salacheep, Error Compensation and Uncertainty Evaluation of CMMs Based on Kinematic Error Models and Gaussian Processes, Department of Mechanical, Aerospace & Civil Engineering Brunel University London, Oct. 2016 (Year: 2016).*

* cited by examiner

CALIBRATION METHOD

CROSS-REFERENCE TO RELATED APPLICATIONS

The present application claims priority to Japanese Patent Applications number 2020-134961, filed on Aug. 7, 2020. The contents of this application are incorporated herein by reference in their entirety.

BACKGROUND OF THE DISCLOSURE

A coordinate measuring apparatus is known as a measuring device for measuring dimensions and geometries of an object to be measured.

The coordinate measuring apparatus is calibrated using a reference instrument, such as a ball plate, in order to maintain accuracy of measurement (for example, see Japanese Patent No. 4,584,029).

A plurality of reference balls on a ball plate are arranged at predetermined intervals.

It is conceivable to calibrate the interval between the reference balls using a coordinate measuring apparatus.

However, due to the existence of scale errors in the coordinate measuring apparatus, there is a problem that the interval cannot be measured with high accuracy when the interval between the plurality of reference balls of the ball plate is measured using the coordinate measuring apparatus.

BRIEF SUMMARY OF THE DISCLOSURE

The present disclosure focuses on these points, and an object of the present disclosure is to improve the accuracy of calibrating a reference instrument.

A calibration method according to the first aspect of the present disclosure is a calibration method for calibrating, with a coordinate measuring apparatus, an interval between a plurality of objects to be measured in a reference instrument, the method includes the steps of placing a structure to be measured used for measuring a scale error of the coordinate measuring apparatus at a first position in a measurement direction of the scale error, the structure to be measured including a body to be measured and a reflector connected to the body to be measured, measuring a first distance from a laser interferometer to the reflector by having the laser interferometer irradiate the reflector with a laser beam in the measurement direction, and measuring first coordinates in the measurement direction of the body to be measured with the coordinate measuring apparatus, while the structure to be measured is at the first position, moving the structure to be measured in the measurement direction to a second position different from the first position, measuring a second distance from the laser interferometer to the reflector by having the laser interferometer irradiate the reflector with the laser beam in the measurement direction, and measuring second coordinates in the measurement direction of the body to be measured with the coordinate measuring apparatus, while the structure to be measured is at the second position, determining a scale error of the coordinate measuring apparatus by comparing (i) a difference between the first distance and the second distance and (ii) a difference between the first coordinates and the second coordinates, placing the reference instrument such that the plurality of objects to be measured is positioned in the measurement direction of the coordinate measuring apparatus, measuring the interval between the plurality of objects to be measured with the coordinate measuring apparatus after the placing the reference instrument, and calculating a calibration value of the interval between the plurality of objects to be measured of the reference instrument by correcting, with the scale error, a result of measuring the interval between the plurality of objects to be measured of the coordinate measuring apparatus.

A calibration method according to the second aspect of the present disclosure is a calibration method for calibrating, with a coordinate measuring apparatus, an interval between a plurality of objects to be measured in a reference instrument, the method includes the steps of placing a structure to be measured used for measuring a scale error of the coordinate measuring apparatus at a first position in a measurement direction of the scale error, the structure to be measured including a portion to be measured and a reflection portion that reflects a radiated laser beam, measuring a first distance from a laser interferometer to the reflection portion by having the laser interferometer irradiate the reflection portion with a laser beam in the measurement direction, and measuring first coordinates in the measurement direction of the portion to be measured with the coordinate measuring apparatus, while the structure to be measured is at the first position, moving the structure to be measured in the measurement direction to a second position different from the first position, measuring a second distance from the laser interferometer to the reflection portion by having the laser interferometer irradiate the reflection portion with the laser beam in the measurement direction, and measuring second coordinates in the measurement direction of the portion to be measured with the coordinate measuring apparatus, while the structure to be measured is at the second position, determining a scale error of the coordinate measuring apparatus by comparing (i) a difference between the first distance and the second distance and (ii) a difference between the first coordinates and the second coordinates, placing the reference instrument such that the plurality of objects to be measured is positioned in the measurement direction of the coordinate measuring apparatus, measuring the interval between the plurality of objects to be measured with the coordinate measuring apparatus after the placing the reference instrument, and calculating a calibration value of the interval between the plurality of objects to be measured of the reference instrument by correcting, with the scale error, a result of measuring the interval between the plurality of objects to be measured of the coordinate measuring apparatus.

DETAILED DESCRIPTION OF THE DISCLOSURE

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Outline of a Calibration Method>

This calibration method is a method for calibrating an interval between a plurality of objects to be measured in a reference instrument with a coordinate measuring apparatus (that is, a coordinate measuring machine). The plurality of objects to be measured is, for example, a plurality of reference balls included in a ball plate or a plurality of apertures included in the ball plate. The present calibration method i) determines a scale error of the coordinate measuring apparatus for measuring the plurality of objects to be measured, and ii) calibrates the interval between the plurality of objects to be measured included in the reference instrument on the basis of the determined scale error of the coordinate measuring apparatus and the interval between the plurality of objects to be measured which is measured by the coordinate measuring apparatus. In the present embodiment, a method for calibrating the interval between two reference balls among a plurality of reference balls included in the ball plate will be described, as an example.

<Flowchart of the Calibration Method>

Figure 1:
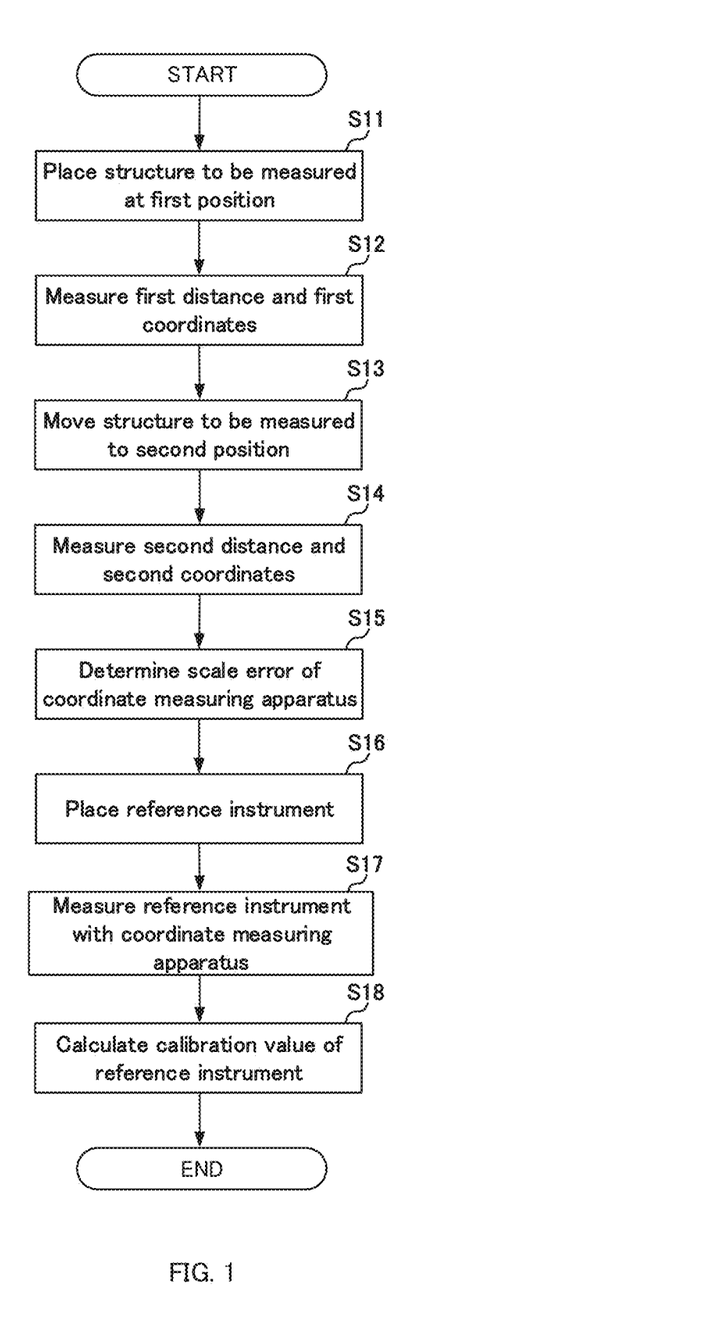
FIG. 1 is a flowchart showing a method for calibrating an interval between a plurality of reference balls of a reference instrument according to the present embodiment.
Figure 2:
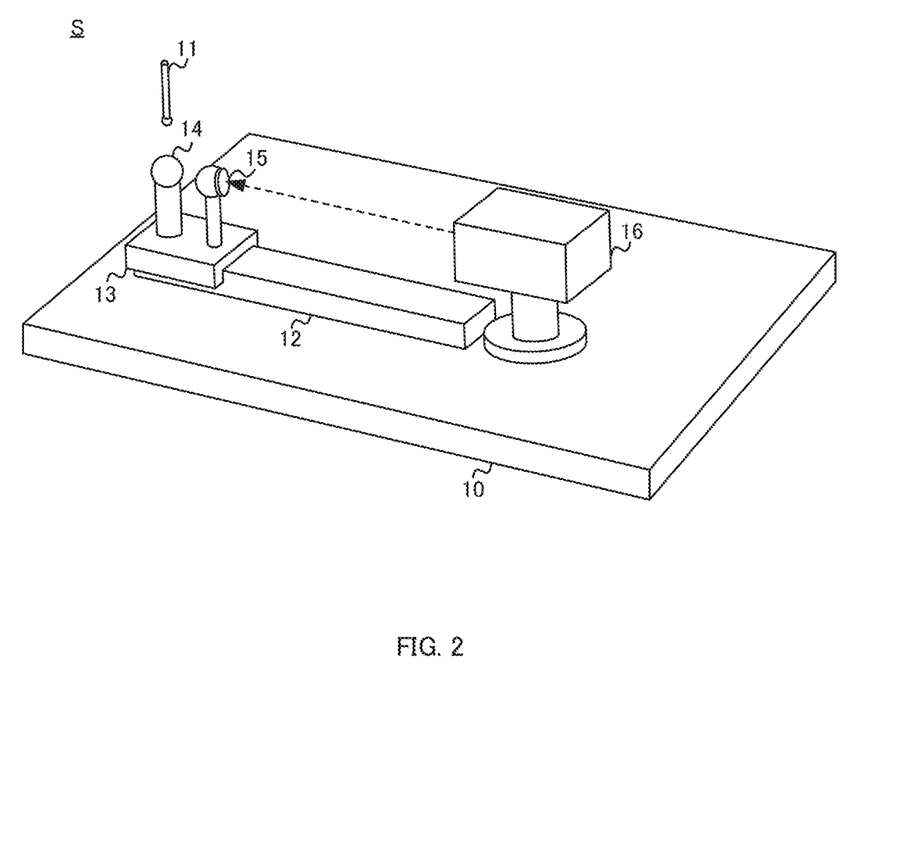
FIG. 2 is a diagram for explaining a method for determining a scale error of a coordinate measuring apparatus S.
Figure 3:
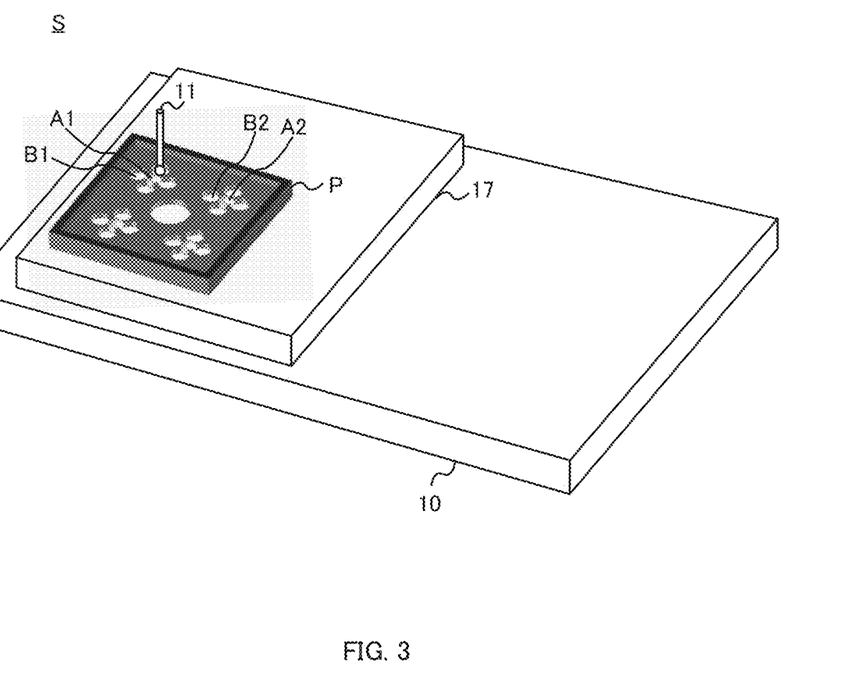
FIG. 3 is a diagram for explaining a method for measuring an interval between a plurality of reference balls included in a ball plate P.

FIG. 1 is a flowchart showing a method for calibrating the interval between the plurality of reference balls of a reference instrument according to the present embodiment. FIG. 2 is a diagram for explaining a method for determining the scale error of a coordinate measuring apparatus S. FIG. 3 is a diagram for explaining a method for measuring the interval between the plurality of reference balls included in a ball plate P.

FIG. 2 shows a state in which tools used for measuring the scale error of the coordinate measuring apparatus S, namely a rail 12, a slider 13, a body to be measured 14, a reflector 15, and a laser interferometer 16, are placed on a surface-plate surface 10 of the coordinate measuring apparatus S. In the present calibration method, the interval between the plurality of reference balls is calibrated by a) making measurements to determine the scale error using the tools shown in FIG. 2 and a probe 11 of the coordinate measuring apparatus S, and then b) placing the ball plate P on the surface-plate surface 10 and measuring the interval between the plurality of reference balls included in the ball plate P as shown in FIG. 3. A calculation for determining the scale error is performed by a computer (not shown), for example.

The surface-plate surface 10 is a surface of a surface-plate included in the coordinate measuring apparatus S. The probe 11 is a probe included in the coordinate measuring apparatus S. The rail 12 is a rectangular parallelepiped object placed on the surface-plate surface 10.

The slider 13, the body to be measured 14, and the reflector 15 are included in a structure to be measured, whose movement distance is measured by each of the coordinate measuring apparatus S and the laser interferometer 16 in order to measure the scale error. The slider 13 is combined with the body to be measured 14 and the reflector 15, and moves on an upper surface of the rail 12. The body to be measured 14 is an object whose position is measured by the coordinate measuring apparatus S that makes the probe 11 contact the body to be measured 14, and includes a spherical portion, for example. The reflector 15 is an object that retro-reflects a laser radiated by the laser interferometer 16, and includes a flat surface facing the laser interferometer 16. The laser interferometer 16 measures a distance between the laser interferometer 16 and the reflector 15 by irradiating the reflector 15 with laser beam. A pedestal 17 shown in FIG. 3 is a pedestal on which the ball plate P is placed.

The procedure of the calibration method will be described below according to the flowchart shown in FIG. 1.

In the first step, with the tools placed on the surface-plate surface 10 as shown in FIG. 2, the slider 13 is placed at the first position, which is a position on the upper surface of the rail 12 (step S11). Specifically, the structure to be measured including the body to be measured 14 and the reflector 15 connected to the body to be measured 14, which are used for measuring the scale error of the coordinate measuring apparatus S, is placed at a first position in a measurement direction the scale error. The measurement direction matches the longitudinal direction of the rail 12. A position of the structure to be measured is a position of any one of the portions of the slider 13, the body to be measured 14, and the reflector 15 included in the structure to be measured, and is the center position of a sphere included in the body to be measured 14, for example.

In the next step, the laser interferometer 16 measures a first distance, and the coordinate measuring apparatus S measures first coordinates while the structure to be measured is at the first position (step S12). Specifically, the laser interferometer 16 measures the first distance from the laser interferometer 16 to the reflector 15 by irradiating the reflector 15 with the laser beam in the measurement direction. The coordinate measuring apparatus S measures the first coordinates of the structure to be measured in the measurement direction. The order of performing the measurement of the first distance by the laser interferometer 16 and the measurement of the first coordinates by the coordinate measuring apparatus S is arbitrary.

As shown in FIG. 2, the laser interferometer 16 is placed such that the direction of the laser beam radiated by the laser interferometer 16 matches the longitudinal direction of the rail 12. The laser interferometer 16 is placed such that the center of the sphere at one end of the body to be measured 14 and the center of a retroreflector at one end of the reflector 15 are located on an optical axis of the laser beam emitted by the laser interferometer. In this way, the measurement according to the present calibration method can be less affected by the Abbe error.

The coordinate measuring apparatus S measures coordinates corresponding to the position on the body to be measured 14 contacted by the probe 11. The coordinate measuring apparatus S measures a plurality of coordinates of a plurality of positions on the body to be measured 14 in order to improve the accuracy of measuring the position in the measurement direction, for example, and specifies the first coordinates indicating a predetermined position of the body to be measured 14 on the basis of the plurality of measured coordinates. The coordinate measuring apparatus S measures the coordinates of a plurality of positions on a surface of the body to be measured 14 when the body to be measured 14 is a sphere, for example. The coordinate measuring apparatus S then determines that coordinates of a position equidistant from the plurality of positions are the first coordinates indicating the center position of the body to be measured 14.

The coordinate measuring apparatus S measures the coordinates of the position of the body to be measured 14 on the basis of the plurality of coordinates in this manner, thereby suppressing a measurement error due to the differences among the positions on the body to be measured 14 contacted by the probe 11.

In the next step, after measuring the first distance and the first coordinates, the structure to be measured is moved to a second position, which is different from the first position, in the measurement direction (step S13). Specifically, the slider 13 is moved to the second position along the rail 12. The second position is a position obtained by moving the structure to be measured by a distance corresponding to a specification value of the interval between the plurality of objects to be measured along the rail 12 from the first position, for example. Specifically, the second position is a position that is apart from the first position by the same distance as the distance between reference balls A1 and A2 included in the ball plate P along the longitudinal direction of the rail 12.

By using a distance close to a specification value of an object to be calibrated as the distance between the first position and the second position in this way, the accuracy of measuring the scale error in a measurement range of the coordinate measuring apparatus S used for calibrating the ball plate P in the present calibration method is increased. Further, since the slider 13 is configured to move along the longitudinal direction of the rail 12, the present calibration method can determine the scale error between arbitrary first and second positions. As a result, the present calibration method can accommodate each of the different intervals between the plurality of objects to be measured included in the plurality of reference instruments.

In the next step, the laser interferometer 16 measures a second distance and the coordinate measuring apparatus S measures second coordinates while the structure to be measured is at the second position (step S14). Specifically, the laser interferometer 16 measures the second distance from the laser interferometer 16 to the reflector 15 by irradiating the reflector 15 with the laser beam in the measurement direction, and the coordinate measuring apparatus S measures the second coordinates of the structure to be measured in the measurement direction.

In the next step, the scale error of the coordinate measuring apparatus S is determined (step S15). The scale error of the coordinate measuring apparatus S is determined by, for example, comparing a) the difference between the first distance and the second distance and b) the difference between the first coordinates and the second coordinates, using a computer. For example, if the difference between the first distance and the second distance is "300 mm+1 μm," and a distance corresponding to the difference between the first coordinates and the second coordinates is "300 mm," the scale error of the coordinate measuring apparatus S is determined to be "−1 μm."

After determining the scale error of the coordinate measuring apparatus S with the above procedure, the tools used for measuring the scale error are removed from the surface-plate surface 10, and the coordinate measuring apparatus S, whose scale error has been determined, measures the interval between the plurality of reference balls A1 and A2 included in the ball plate P placed on the surface-plate surface 10. Next, the calibration value of the interval between the reference ball A1 and the reference ball A2 is calculated on the basis of the measured interval and the determined scale error of the coordinate measuring apparatus S.

In the next step, in order to measure the interval between the plurality of reference balls A1 and A2 included in the ball plate P, which is the reference instrument, the ball plate P is placed such that the plurality of reference balls A1 and A2 are located in the measurement direction (the longitudinal direction of the rail 12) (step S16). Specifically, the ball plate P is placed at the position where the structure to be measured was placed. More specifically, the ball plate P is placed on the surface-plate surface 10 such that the plurality of reference balls A1 and A2, which are the plurality of objects to be measured, is located at the first and second positions.

In the ball plate P shown in FIG. 3, the reference balls A1 and A2, which are the objects to be measured, have circular peripheries. Further, the ball plate P includes a plurality of apertures adjacent to each of the reference balls A1 and A2. In this case, the ball plate P is placed such that the reference ball A1 and the reference ball A2 are located at the first position and the second position or in the vicinity of the first position and the second position. In FIG. 3, the reference ball A1 corresponds to the first position, and the reference ball A2 corresponds to the second position, for example. By placing the ball plate P in this way, the position where the scale error was measured and a position to be measured on the ball plate P substantially match, and the accuracy of calibration is improved.

When the ball plate P is placed on the surface-plate surface 10, the ball plate P may be placed on an upper surface of the pedestal 17 placed on an upper surface of the surface-plate surface 10, as shown in FIG. 3. The pedestal 17 is placed, for example, at a position where the structure to be measured was placed in at least one of step S11 and step S13. Placing the ball plate P on the upper surface of the pedestal 17 allows adjusting the height of the position on the ball plate P contacted by the probe 11 to be equal to the center position of the body to be measured 14, for example. By making such adjustments, the ball plate P can be measured under the same conditions as when the scale error of the coordinate measuring apparatus S was measured, and the accuracy of calibration is further improved.

In the next step, the reference instrument is measured by the coordinate measuring apparatus S (step S17). In the present embodiment, the interval between the plurality of reference balls A1 and A2, which are the plurality of objects to be measured, provided to the ball plate P, which is the reference instrument, is measured by the coordinate measuring apparatus S. Specifically, the coordinate measuring apparatus S measures coordinates of the reference ball A1 and coordinates of the reference ball A2, and determines an interval corresponding to the difference between the measured coordinates.

In the next step, the calibration value of the reference instrument is calculated (step S18). Specifically, a result of measuring the interval between the plurality of reference balls A1 and A2, which are the objects to be measured, by the coordinate measuring apparatus S is corrected with the scale error of the coordinate measuring apparatus S determined in step S15, to calculate the calibration value of the interval between the plurality of reference balls A1 and A2 on the ball plate P, which is the reference instrument. For example, if the result of measuring the interval between the reference ball A1 and the reference ball A2 is "300 mm+2 μm," and the scale error of the coordinate measuring apparatus S is "−1 μm," the value of the measured interval corrected by scale error is "300 mm+3 μm." In this case, when the specification value of the interval between the reference balls A1 and A2 is "300 mm," the calibration value can be calculated as "3 μm."

It should be noted that, the interval between the reference balls A1 and A2, which are the objects to be measured, included in the ball plate P shown in FIG. 3 was measured in the above explanation, but the reference instrument is not limited to the form of the ball plate P shown in FIG. 3. The reference instrument may be, for example, a reference instrument having a triangular pyramid shape or a rectangular parallelepiped shape with objects to be measured being provided at some of the vertexes thereof. Further, the reference instrument may be, for example, a reference instrument including a plurality of objects to be measured being provided in a row or in a lattice shape. In this case, the coordinate measuring apparatus S calculates a plurality of calibration values for each of the plurality of objects to be measured by measuring the interval between these objects to be measured and their adjacent objects to be measured.

<First Variation>

Figure 4A:
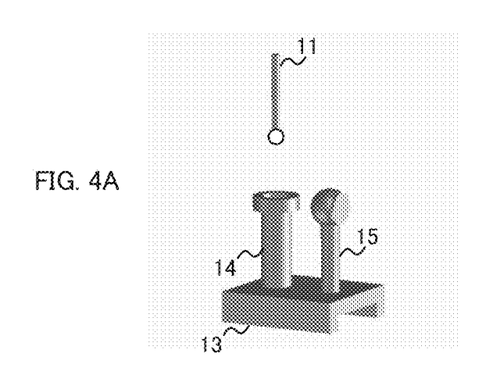
FIGS. 4A and 4B are diagrams for explaining another example of the geometry of a body to be measured 14.
Figure 4B:
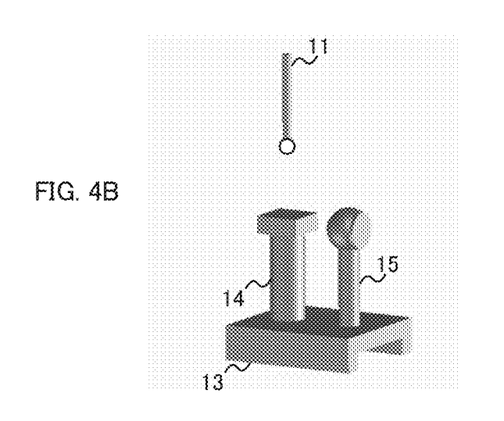

In the above description, a case where a sphere is formed at the one end of the body to be measured 14 that is to be measured by the coordinate measuring apparatus S has been described, but geometry of the one end of the body to be measured 14 to be measured by the coordinate measuring apparatus S is not limited to a sphere. FIGS. 4A and 4B are diagrams for explaining another example of the geometry of the body to be measured 14. FIG. 4A shows an example in which the one end of the body to be measured 14 is a ring-shaped cylinder. FIG. 4B shows an example in which the one end of the body to be measured 14 has a block shape (rectangular parallelepiped).

In FIG. 4A, the coordinate measuring apparatus S measures the first coordinates and the second coordinates by making the probe 11 contact an inner periphery or an outer periphery of the ring-shaped cylinder included in the body to be measured 14. In FIG. 4B, the coordinate measuring apparatus S measures the first coordinates and the second coordinates by making the probe 11 contact a plurality of planes that are surfaces of the block included in the body to be measured 14. Thus, by measuring the geometry of the one end of the body to be measured 14 that is different from a sphere, the coordinate measuring apparatus S can perform measurement with the measurement error suppressed due to the differences in the positions contacted by the probe 11.

<Second Variation>

Figure 5:
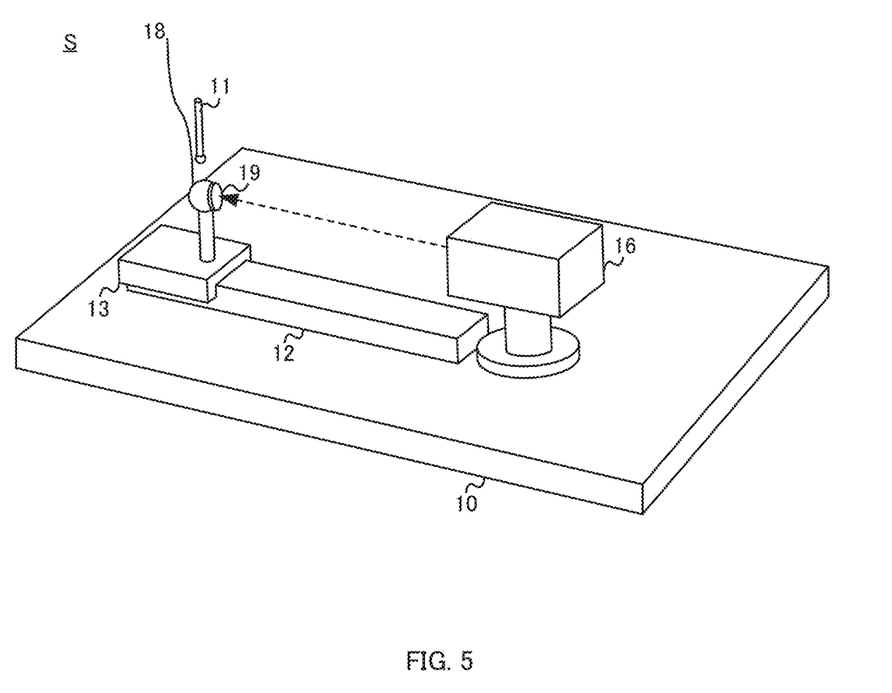
FIG. 5 is a diagram for explaining another example of the geometry of the body to be measured 14 and a reflector 15.

In the above description, the body to be measured 14 and the reflector 15 were different objects, but the body to be measured 14 and the reflector 15 may be a single object. FIG. 5 is a diagram for explaining another example of geometries of the body to be measured 14 and the reflector 15. FIG. 5 differs from FIG. 2 in that the body to be measured 14 is replaced with a portion to be measured 18 and the reflector 15 is replaced with a reflection portion 19, and is the same in other respects.

The structure to be measured in FIG. 5 includes the slider 13, the portion to be measured 18, and the reflection portion 19. The portion to be measured 18 and the reflection portion 19 are coupled to each other. The portion to be measured 18 is a portion whose position is measured by the coordinate measuring apparatus S that makes the probe 11 contact the portion to be measured 18, and is a sphere, for example. The reflection portion 19 is a portion that retro-reflects the laser radiated by the laser interferometer 16.

When the present calibration method is performed using the structure to be measured shown in FIG. 5, the coordinate measuring apparatus S measures the first coordinates and the second coordinates of the structure to be measured in the measurement direction by making the probe 11 contact the portion to be measured 18. The laser interferometer 16 measures the first distance and the second distance from the laser interferometer 16 to the reflection portion 19 by irradiating the reflection portion 19 with the laser beam in the measurement direction.

With such a configuration, the coordinate measuring apparatus S and the laser interferometer 16 can measure the object to be measured at the same position, and the accuracy of measuring the scale error is further improved. Furthermore, a structure of the structure to be measured can be simplified.

<Third Variation>

The above description illustrated a case where the difference between the first coordinates and the second coordinates and the interval between the reference balls A1 and A2 are the same or close to each other in a step of placing the reference instrument, but the difference between the first coordinates and second coordinates and the interval between the reference balls A1 and A2 may be different.

In this case, the difference between the first coordinates and the second coordinates used for determining the scale error of the coordinate measuring apparatus S is compared with the interval between the reference balls A1 and A2 to calculate a proportional amount of the interval between the reference balls A1 and A2 relative to the difference between the first coordinates and the second coordinates. Then, the calibration value of the interval between the reference balls A1 and A2 is determined on the basis of the calculated proportional amount and the determined scale error of the coordinate measuring apparatus S.

For example, if a distance corresponding to the difference between the first coordinates and the second coordinates is "300 mm" and the scale error is "−1 µm," the calibration value is calculated with the scale error as "−2 µm," if the interval between the reference balls A1 and A2 is "600 mm." By calculating the calibration value in this manner, the calibration method can calculate the calibration value even when, for example, the interval between the reference balls A1 and A2 is longer than the distance in the longitudinal direction of the rail 12.

<Fourth Variation>

In the above description, the calibration value of the interval between the reference balls A1 and A2 was calculated by measuring the interval between the reference balls A1 and A2 after determining the scale error of the coordinate measuring apparatus S, but the calibration value of the interval between the reference balls A1 and A2 may be calculated by determining the scale error of the coordinate measuring apparatus S after measuring the interval between the reference balls A1 and A2.

Specifically, the interval between the reference ball A1 and the reference ball A2 included in the ball plate P is measured first by performing the procedure from step S16 to step S17 shown in FIG. 1. Subsequently, the scale error of the coordinate measuring apparatus S is determined by performing the procedure from step S11 to step S15 shown in FIG. 1. Then, the calibration value of the interval between the reference ball A1 and the reference ball A2 included in the ball plate P is calculated by performing the procedure of step S18 shown in FIG. 1.

<Effect of the Calibration Method According to the Present Embodiment>

As described above, the calibration method according to the present embodiment includes the steps of measuring the first distance from the laser interferometer 16 to the reflector 15 with the laser interferometer 16 and measuring the first coordinates of the body to be measured 14 with the coordinate measuring apparatus S, moving the structure to be measured including the body to be measured 14 and the reflector 15, measuring the second distance from the laser interferometer 16 to the reflector 15 with the laser interferometer 16 after the moving and measuring the second coordinates of the body to be measured 14 with the coordinate measuring apparatus S after the moving, determining the scale error of the coordinate measuring apparatus S on the basis of the difference between the first distance and the second distance measured, measuring the interval between the reference balls, which are the objects to be measured, of the reference instrument with the coordinate measuring apparatus S, and calculating the calibration value of the interval between the reference balls on the basis of the measured interval between the reference balls and the scale error of the coordinate measuring apparatus S.

By calibrating the reference instrument in such a manner, the calibration value of the interval between the plurality of objects to be measured included in the reference instrument can be calculated while considering the scale error of the coordinate measuring apparatus S, and the accuracy of calibrating the reference instrument is further improved.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A calibration method for calibrating, with a coordinate measuring apparatus, an interval between a plurality of objects to be measured in a reference instrument, the method comprising the steps of:
   placing a structure to be measured used for measuring a scale error of the coordinate measuring apparatus at a first position in a measurement direction of the scale error, the structure to be measured including a body to be measured and a reflector connected to the body to be measured;
   measuring a first distance from a laser interferometer to the reflector by having the laser interferometer irradiate the reflector with a laser beam in the measurement direction, and measuring first coordinates in the measurement direction of the body to be measured with the coordinate measuring apparatus, while the structure to be measured is at the first position;
   moving the structure to be measured in the measurement direction to a second position different from the first position;
   measuring a second distance from the laser interferometer to the reflector by having the laser interferometer irradiate the reflector with the laser beam in the measurement direction, and measuring second coordinates in the measurement direction of the body to be measured with the coordinate measuring apparatus, while the structure to be measured is at the second position;
   determining a scale error of the coordinate measuring apparatus by comparing (i) a difference between the first distance and the second distance and (ii) a difference between the first coordinates and the second coordinates;
   placing the reference instrument such that the plurality of objects to be measured is positioned in the measurement direction of the coordinate measuring apparatus;
   measuring the interval between the plurality of objects to be measured with the coordinate measuring apparatus after the placing the reference instrument; and
   calculating a calibration value of the interval between the plurality of objects to be measured of the reference instrument by correcting, with the scale error, a result of measuring the interval between the plurality of objects to be measured of the coordinate measuring apparatus.

2. The calibration method according to claim 1, wherein in the measuring the first coordinates, the coordinate measuring apparatus measures a plurality of coordinates of a plurality of positions on the body to be measured, and specifies the first coordinates indicating a predetermined position of the body to be measured on the basis of the plurality of coordinates measured.

3. The calibration method according to claim 1, wherein in the moving the structure to be measured, the structure to be measured is moved by a distance corresponding to a specification value of the interval between the plurality of objects to be measured.

4. The calibration method according to claim 1, wherein in the moving the structure to be measured, the structure to be measured is moved along a rail whose longitudinal direction matches the measurement direction.

5. The calibration method according to claim 4, wherein in the moving the structure to be measured, the structure to be measured is moved by a distance corresponding to the specification value of the interval between the plurality of objects to be measured along the rail whose longitudinal direction matches the measurement direction.

6. The calibration method according to claim 1, wherein in the placing the reference instrument, the reference instrument is placed at a position where the structure to be measured was placed.

7. The calibration method according to claim 6, wherein in the placing the reference instrument, the reference instrument is placed such that the plurality of objects to be measured are positioned at the first position and the second position.

8. The calibration method according to claim 1, wherein in the placing the reference instrument, the reference instrument is placed on an upper surface of a pedestal placed at the position where the structure to be measured was placed.

9. The calibration method according to claim 8, wherein in the placing the reference instrument, the reference instrument is placed so that the plurality of objects to be measured are located at the first position and the second position.

10. A calibration method for calibrating, with a coordinate measuring apparatus, an interval between a plurality of objects to be measured in a reference instrument, the method comprising the steps of:
   placing a structure to be measured used for measuring a scale error of the coordinate measuring apparatus at a first position in a measurement direction of the scale error, the structure to be measured including a portion to be measured and a reflection portion that reflects a radiated laser beam;
   measuring a first distance from a laser interferometer to the reflection portion by having the laser interferometer irradiate the reflection portion with a laser beam in the measurement direction, and measuring first coordinates in the measurement direction of the portion to be measured with the coordinate measuring apparatus, while the structure to be measured is at the first position;
   moving the structure to be measured in the measurement direction to a second position different from the first position;

measuring a second distance from the laser interferometer to the reflection portion by having the laser interferometer irradiate the reflection portion with the laser beam in the measurement direction, and measuring second coordinates in the measurement direction of the portion to be measured with the coordinate measuring apparatus, while the structure to be measured is at the second position;

determining a scale error of the coordinate measuring apparatus by comparing (i) a difference between the first distance and the second distance and (ii) a difference between the first coordinates and the second coordinates;

placing the reference instrument such that the plurality of objects to be measured is positioned in the measurement direction of the coordinate measuring apparatus;

measuring the interval between the plurality of objects to be measured with the coordinate measuring apparatus after the placing the reference instrument; and calculating a calibration value of the interval between the plurality of objects to be measured of the reference instrument by correcting, with the scale error, a result of measuring the interval between the plurality of objects to be measured of the coordinate measuring apparatus.

* * * * *